United States Patent [19]
Wang

[11] Patent Number: 5,186,226
[45] Date of Patent: Feb. 16, 1993

[54] WOODWORKING MACHINE WITH MEANS FOR PROVIDING 3-DIMENSIONAL CUTTING TOOL MOVEMENT

[76] Inventor: Tian-Wang Wang, No. 45, Yi Chang E. Rd., Tai Ping Hsiang, Taichung Hsien, Taiwan

[21] Appl. No.: 896,658

[22] Filed: Jun. 10, 1992

[51] Int. Cl.$^5$ .................................................. B27M 3/00
[52] U.S. Cl. ..................................... 144/144 R; 144/82; 144/84; 144/85; 144/145 R; 144/372; 409/108; 409/124
[58] Field of Search .................. 409/89, 124, 108, 84; 144/82, 83, 84, 85, 87, 137, 144 R, 144 S, 145 R, 371, 372, 136 R, 136 A, 134 R

[56] References Cited

U.S. PATENT DOCUMENTS

| | | | |
|---|---|---|---|
| 2,166,831 | 7/1939 | Wazac, Sr. | 144/84 |
| 2,543,917 | 3/1951 | Lloyd | 144/136 A |
| 2,912,879 | 11/1959 | Bannow | 74/52 S |
| 4,445,553 | 5/1984 | Hanyzewski | 144/145 A |
| 4,509,572 | 4/1985 | L'Archer | 144/145 R |
| 4,749,013 | 6/1988 | Ducate, Sr. | 144/137 |
| 4,909,292 | 3/1990 | Wirth, Jr. | 144/144 R |

Primary Examiner—W. Donald Bray
Attorney, Agent, or Firm—Bacon & Thomas

[57] ABSTRACT

A woodworking machine having first and second carriages controlled by a work handle to carry a cutting tool carrier in X-Y direction, which cutting tool carrier can be directly moved by the work handle in Z direction, a chucking slide and a workpiece retaining screw for holding a workpiece during horizontal operation mode, and a seat plate and an auxiliary chucking plate for holding a workpiece during vertical operation mode.

1 Claim, 4 Drawing Sheets

WOODWORKING MACHINE WITH MEANS FOR PROVIDING 3-DIMENSIONAL CUTTING TOOL MOVEMENT

BACKGROUND OF THE INVENTION

The present invention relates to a woodworking machine and more particularly relates to such a woodworking machine in which the cutting tool can be conveniently moved in X-Y-Z direction by means of the control of a work handle.

A variety of woodworking of copying machines are known and widely in use. In U.S. Pat. No. 4,593,735, there is disclosed a boring, mortising, tenoning and duplicating woodworking tool which comprises means for providing movement of a workpiece in a horizontal plane, and means for providing vertical cutting tool movement. This structure of woodworking tool is consisted of a variety of complicated parts which may be damaged easily. Another disadvantage of this structure of woodworking tool is its expensive manufacturing cost. Furthermore, this structure of woodworking tool is inconvenient to operate in moving the cutting tool.

SUMMARY OF THE INVENTION

The present invention has been accomplished to eliminate the aforesaid disadvantages. It is therefore an object of the present invention to provide a woodworking machine which has means for providing movement of the cutting tool in X-Y-Z direction. It is another object of the present invention to provide a woodworking machine which can be used horizontally as well as vertically. It is still another object of the present invention to provide a woodworking machine which is simple in structure and easy to operate. It is still another object of the present invention to provide a woodworking machine which provides high mobility.

According to the preferred embodiment of the present invention, the woodworking machine is generally comprised of a base, a first carriage movably supported on the base, a second carriage movably supported on the first carriage, a cutting tool carrier movably supported on the second carriage, a work handle controlled to move the first and second carriages and the cutting tool carrier, a chucking slide movably supported on the base, an auxiliary chucking plate movably received in a receiving chamber on the chucking slide, a mold holder, and a workpiece retaining screw rod. The first and second carriages can be controlled by the work handle to carry the cutting tool carrier in X-Y direction; the cutting tool carrier can be directly moved by the work handle in Z direction. The chucking slide and the workpiece retaining screw are provided for holding a workpiece during horizontal operation mode. The seat plate and the auxiliary chucking plate are provided for holding a workpiece during vertical operation mode.

DETAILED DESCRIPTION OF THE PREFERRED EMBODIMENT

Figure 1:
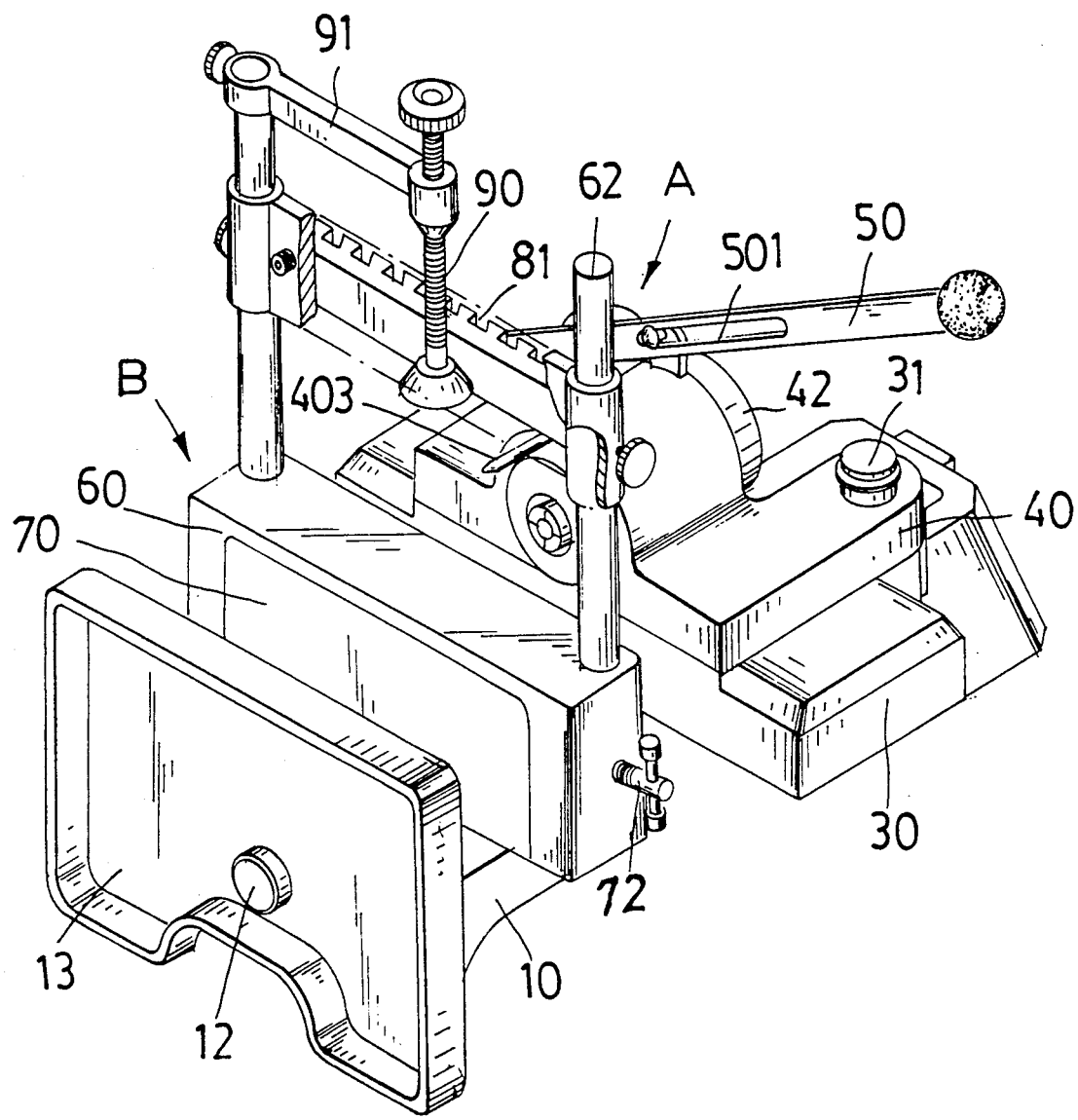
FIG. 1 is an elevational view of a woodworking machine embodying the present invention.
Figure 2:
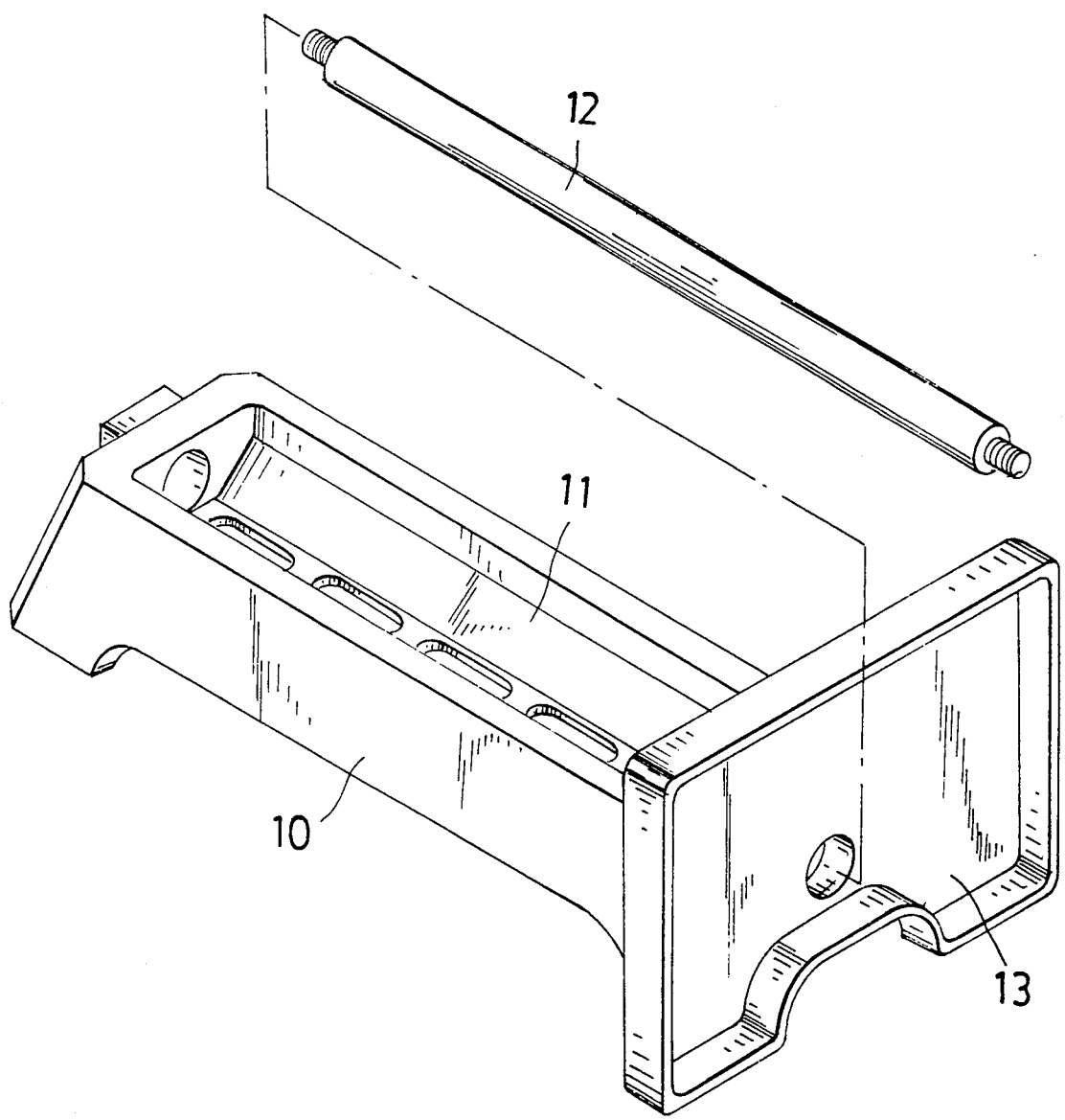
FIG. 2 is an exploded view of the base and the first horizontal axle.
Figure 3:
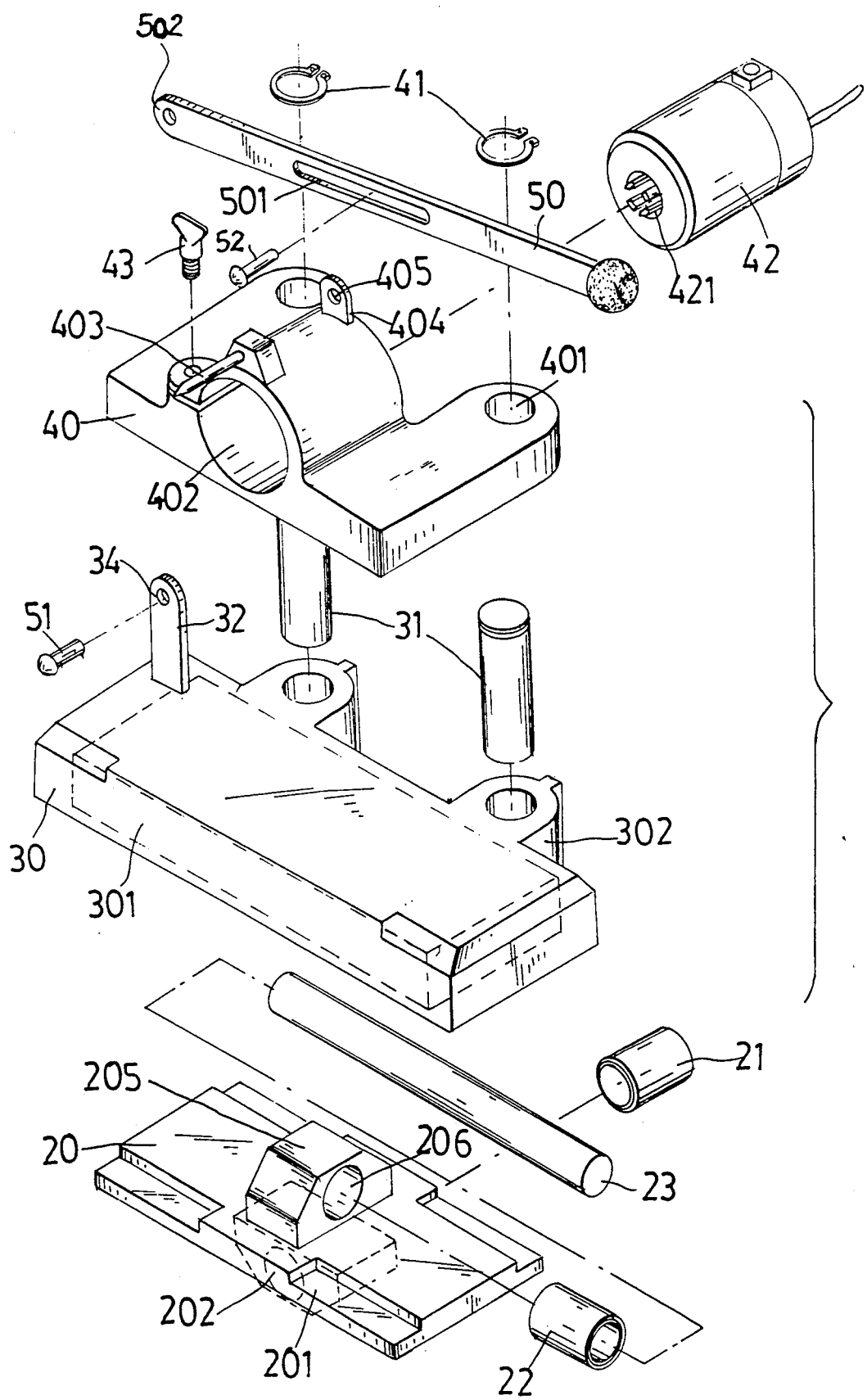
FIG. 3 is an exploded view of the parts indicated at A in FIG. 1 which include the first carriage, the second carriage, the cutting tool carrier and the work handle.
Figure 4:
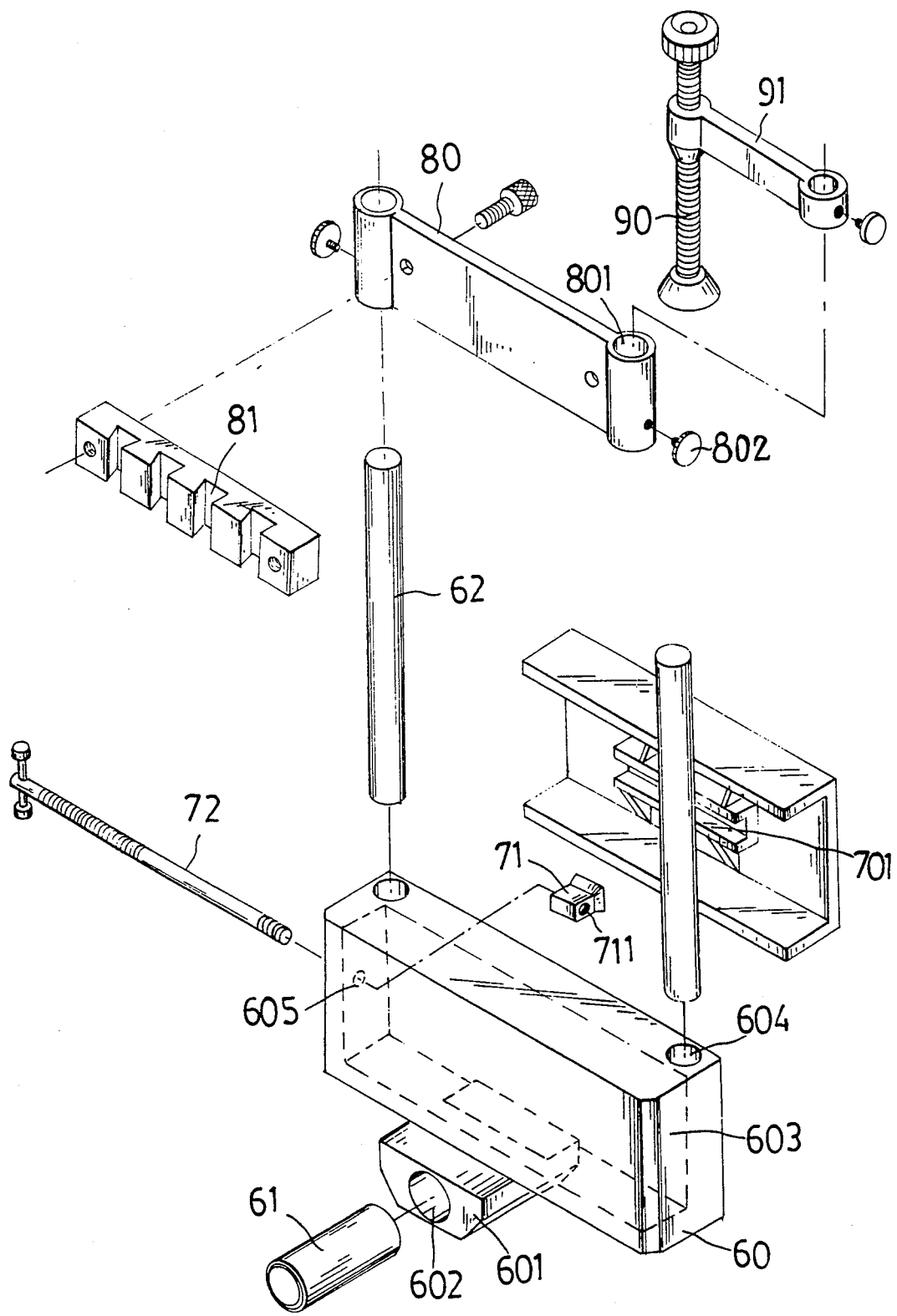
FIG. 4 is an exploded view of the parts indicated at B in FIG. 1 which include the chucking slide, the auxiliary chucking plate, the mold holder, and the workpiece retaining screw rod.

Referring to FIGS. 1, 2 and 3, a woodworking machine as constructed in accordance with the present invention is generally comprised of a base 10, a first carriage 20, a second carriage 30, a cutting tool carrier 40, a work handle 50, a chucking slide 60, an auxiliary chucking plate 70, a mold holder 80, and a workpiece retaining screw rod 90.

The base 10 comprises a first horizontal axle 12 horizontally fastened in a longitudinal guide channel 11 thereof, and a seat plate 13 vertically disposed at one end.

The first carriage 20 which is supported on the base 10 spaced from the seat plate 13, comprises a circular through hole 202 through a bottom block 201 thereof in transverse direction fastened with a bearing 21, a circular through hole 206 through a top block 205 thereof in longitudinal direction fastened with a bearing 22 through which a second horizontal axle 23 is inserted. When assembled, the first carriage 20 is bridged over the base 10 with the bottom block 201 disposed in the guide groove 11 and sleeved on the first horizontal axle 12. Therefore, the first and second horizontal axles 12,23 are crossed over each other through 90 angle.

The second carriage 30 has a recessed guide way 301 formed on the bottom edge thereof in longitudinal direction, in which the second horizontal axle 23 is suspended in longitudinal direction. Therefore, by means of sliding the second horizontal axle 23 in the circular through hole 206 of the top block 205, the second carriage 30 is moved in X direction. The second carriage 30 further comprises two lugs 302 spaced at one side, into which two vertical axles 31 fit respectively, and a vertical support 32 raised from the top edge thereof at one corner, which vertical support 32 has a pivot hole 34 near the top edge thereof.

The cutting tool carrier 40 comprises two circular through holes 401 spaced at one side through which the two vertical axles 31 are inserted and respectively retained in place by clamps 41. Therefore, the cutting tool carrier 40 can be moved along the vertical axles 31 in Z direction. The cutting tool carrier 40 further comprises a transverse through hole 401 at the middle into which a motor 42 is inserted and secured in place by a tightening up screw 43, a pilot 403 transversely extended out of a side edge thereof at the top and disposed in parallel with the shaft 421 of the motor 42, and a vertical support 404 at the top spaced from the pilot 403, which vertical support 401 has a pivot hole 405 near the top edge thereof.

The work handle 50 has a hole 502 near the rear end thereof pivotably connected to the pivot hole 34 of the vertical support 32 of the second carriage 30 by a pin 51, and an elongated slot 501 at the middle movably secured to the pivot hole 405 on the vertical support 404 of the cutting tool carrier 40 by a pin 52.

The chucking slide 60 comprises a circular through hole 602 through a bottom block 601 thereof in transverse direction fastened with a bearing 61, a receiving chamber 603 at one side, two vertical round holes 604 on the top edge thereof at two opposite ends into which two round rods 62 are respectively fastened, a bolt hole 605 on an end edge thereof communicated with the receiving chamber 603. When assembled, the chucking slide 60 is bridged over the base 10 and disposed between the seat plate 13 and the cutting tool carrier 30 with the bottom block 601 disposed in the guide groove 11 and sleeved on the first horizontal axle 12. Therefore, the chucking slide 60 can be moved on the base 10 in Y direction same as the first carriage 20.

The auxiliary chucking plate 70 is formed of a channel plate received in the receiving chamber 603 of the chucking slide 60 and having a right-bevel dovetail slot 701 on the inside in longitudinal direction into which a dovetail block 71 is inserted. The dovetail block 71 has a bolt hole 711 longitudinally aligned with the bolt hole 605 on the chucking slide 60. There is also provided a hand screw 72 threaded through the bolt hole 605 on the chucking slide 60 into the bolt hole 711 on the dovetail block 71 and rotated to move the dovetail block 71 in squeezing the auxiliary chucking plate 70 outwards from the receiving chamber 693.

The mold holder 80 comprises two vertical axle sleeves 801 at two opposite ends respectively sleeved on the two round rods 62 and secured in place by tightening up screws 802 to hold any of a variety of molds 81 for duplicating.

The workpiece retaining screw rod 90 is pivotably secured to either round rod 62 by a horizontal support 91, and rotated up and down on the horizontal support 91 to squeeze a workpiece against the chucking slide 60.

The operation of the present invention is outlined hereinafter. After the mold 81 which is selected according to the mortising, tenoning or duplicating process to be performed has been fastened to the mold holder 80, the mold holder 80 and the horizontal support 91 are respectively adjusted to suitable heights. The workpiece is then placed above the chucking slide 60 and the seat plate 13 and retained in place by the workpiece retaining screw 90. Once electric power has been connected to the motor 42, mortising, tenoning or duplicating process can be started. Moving the work handle 50 horizontally causes the first carriage 20 and second carriage 30 to move along the first and second horizontal axles 12,23 respectively; moving the work handle 50 vertically causes the cutting tool carrier 40 to be moved along the vertical axles 31 in Z direction. Therefore the second carriage 30 can be moved by the first carriage 20 in Y direction; the cutting tool carrier 40 can be moved by the first carriage 20 in X direction or by the work handle 50 in Z direction. During processing, the pilot 403 of the cutting tool carrier 40 is stopped at the mold 81 and moved along the outside surface thereof so that the motor 42 is synchronously moved to carry the cutting tool in mortising, tenoning or duplicating the workpiece.

The woodworking machine may be placed in vertical position by turning up the base 10 permitting the seat plate 13 to be placed on the ground or a flat surface to support the whole body of the machine. Under this vertical mode, the workpiece is placed between the seat plate 13 and the chucking slide 60, and then rotating the hand screw 72 to move the dovetail block 71 causing it to push the auxiliary chucking plate 70 toward the seat plate 13 in holding the workpiece in place. Once the workpiece has been firmly retaining in place, mortising, tenoning or duplicating process can be employed.

I claim:
1. A woodworking machine comprising:
   a base, said base comprising a first horizontal axle horizontally fastened in a longitudinal guide channel thereof, and a seat plate vertically disposed at one end;
   a first carriage movably bridged over said base spaced from said seat plate, said first carriage comprising a bottom block having a hole in transverse direction fastened with a bearing and movably sleeved on said first horizontal axle, a top block having a hole in longitudinal direction fastened with a bearing.
   a second carriage movably supported on said first carriage, said second carriage having a second horizontal axle suspended in a recessed guide way thereon in longitudinal direction, two lugs spaced at one side, two vertical axles fastened to said lugs at the top, and a vertical support raised from a top edge thereof at one corner, said second horizontal axle being inserted through the bearing in the hole on said top block of said first carriage, the vertical support of said second carriage having a pivot hole near a top edge thereof;
   a cutting tool carrier movably supported on said second carriage, said cutting tool carrier comprising two spaced vertical axles respectively inserted through two circular through holes thereof at one side and retained in place by clamps, a motor fastened in a transverse through hole thereof and secured in place by a tightening up screw, said motor having a motor shaft controlled to drive a cutting tool for woodworking, a pilot transversely extended out of a side edge thereof at the top and disposed in parallel with said motor shaft, and a vertical support at the top spaced from said pilot, the vertical support of said cutting tool carrier having a pivot hole near a top edge thereof;
   a work handle for cutting tool moving control, said work handle comprising a hole near a rear end thereof pivotably connected to the pivot hole on the vertical support of said second carriage by a pin, and an elongated slot at the middle movably secured to the pivot hole on the vertical support of said cutting tool carrier by a pin;
   a chucking slide bridged over said base and disposed between said seat plate and said cutting tool carrier, said chucking slide comprising a bottom block having a circular through hole in transverse direction fastened with a bearing and movably sleeved on said first horizontal axle, a receiving chamber at one side, two vertical round rods respectively inserted in two vertical round holes at the top, and a bolt hole on an end edge thereof communicated with said receiving chamber;
   an auxiliary chucking plate formed of a channel plate received in said receiving chamber of said chucking slide, said auxiliary chucking plate having a right-bevel dovetail slot on the inside in longitudinal direction, and a dovetail block inserted in said right-bevel dovetail slot, said dovetail block having a bolt hole longitudinally aligned with the bolt hole on said chucking slide;
   a hand screw threaded through the bolt hole on said chucking slide into the bolt hole on said dovetail block, said hand screw being rotated to move said dovetail block causing said auxiliary chucking plate to be moved back inside said receiving chamber or pushed outwards toward said seat plate;
   a mold holder connected to said round rods of said chucking slide to hold a mold, said mold holder comprising two vertical axle sleeves at two oppo- site ends respectively sleeved on said round rods of said chucking slide and secured in place by tightening up screws;

a workpiece retaining screw rod pivotably secured to either round rod of said chucking slide by a horizontal support and rotated up and down on said horizontal support to squeeze a workpiece against said chucking slide; and wherein said second carriage can be moved by said first carriage in Y direction; said cutting tool carrier can be moved by said first carriage in X direction or by said work handle in Z direction.

* * * * *